(12) United States Patent
Wang

(10) Patent No.: US 7,650,139 B2
(45) Date of Patent: Jan. 19, 2010

(54) METHOD FOR ENSURING SECURITY OF SUBSCRIBER CARD

(75) Inventor: Zhengwei Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 412 days.

(21) Appl. No.: 11/553,825

(22) Filed: Oct. 27, 2006

(65) Prior Publication Data
US 2007/0105530 A1 May 10, 2007

Related U.S. Application Data

(63) Continuation of application No. PCT/CN2005/001344, filed on Aug. 29, 2005.

(30) Foreign Application Priority Data
Aug. 29, 2004 (CN) .......... 2004 1 0076727

(51) Int. Cl.
H04W 12/06 (2009.01)
H04W 12/04 (2009.01)
(52) U.S. Cl. .......... 455/410; 455/411; 380/247; 380/255
(58) Field of Classification Search .......... 455/411, 455/558, 406, 408, 561; 370/388, 340, 329, 370/331, 350; 380/2, 270; 235/380, 379
See application file for complete search history.

(56) References Cited

U.S. PATENT DOCUMENTS

| 5,991,405 | A | 11/1999 | Mills | |
|---|---|---|---|---|
| 6,606,491 | B1 | 8/2003 | Peck | |
| 2004/0015692 | A1 | 1/2004 | Green et al. | 713/169 |
| 2004/0088567 | A1* | 5/2004 | Lamotte | 713/200 |
| 2005/0125502 | A1* | 6/2005 | Fambon et al. | 709/213 |
| 2005/0138390 | A1* | 6/2005 | Adams et al. | 713/185 |
| 2005/0154925 | A1* | 7/2005 | Chitrapu et al. | 713/202 |
| 2006/0000891 | A1* | 1/2006 | Bonalle et al. | 235/380 |
| 2006/0101288 | A1* | 5/2006 | Smeets et al. | 713/194 |

(Continued)

FOREIGN PATENT DOCUMENTS

CN 1291390 4/2001

(Continued)

OTHER PUBLICATIONS

International Search Report for PCT/CN2005/001344, mailed Nov. 17, 2005.

(Continued)

Primary Examiner—Vincent P Harper
Assistant Examiner—Mahendra R Patel
(74) Attorney, Agent, or Firm—Finnegan, Henderson, Farabow, Garrett & Dunner LLP

(57) ABSTRACT

A method for ensuring the security of subscriber cards, includes the following steps: setting a security key in the subscriber card, and setting a verification equipment and storing the security key in the verification equipment; the subscriber card authenticating the verification equipment according to the security key before responding to relevant access request; if the authentication succeeds, the relevant access is permitted; otherwise, the relevant access is refused. With the present invention, the security of the subscriber card is guaranteed without using a PIN code, which is very convenient for the subscriber.

17 Claims, 5 Drawing Sheets

U.S. PATENT DOCUMENTS

2006/0129848 A1* 6/2006 Paksoy et al. ............... 713/193
2006/0288407 A1* 12/2006 Naslund et al. ............... 726/9

FOREIGN PATENT DOCUMENTS

| CN | 1307789 | 8/2001 |
| EP | 0 607 767 A1 | 7/1994 |
| EP | 1050991 | 11/2000 |
| WO | WO 00/01187 A1 | 1/2000 |
| WO | WO 00/24218 A1 | 4/2000 |

OTHER PUBLICATIONS

Menezes et al., "Handbook of Applied Cryptography, Passage," CRC Press Series on Discrete Mathematics and its Applications, Boca Raton, Fl., CRC Press, US, pp. 397-406 (1997).

Supplementary European Search Report for International Application No. PCT/CN2005/001344, dated Mar. 1, 2007.

European Office Action for Application No. 05781777.7-2212, dated May 8, 2007.

* cited by examiner

METHOD FOR ENSURING SECURITY OF SUBSCRIBER CARD

CROSS-REFERENCES TO RELATED APPLICATIONS

This is a continuation of International Application No. PCT/CN2005/001344, which was filed on Aug. 29, 2005, and which, in turn, claimed the benefit of Chinese Patent Application No. 200410076727.4, which was filed on Aug. 29, 2004, the entire disclosures of which are hereby incorporated herein by reference.

BACKGROUND OF THE DISCLOSURE

1. Field of the Invention

The present invention relates to information security techniques, more particularly to a method for ensuring the security of a subscriber card.

2. Background of the Invention

At present, information access of a subscriber card in a mobile terminal, such as a Subscriber Identify Module (SIM) card, is protected by a Personal Identification Number (PIN) code. Specifically, when the PIN code is set for the subscriber card, the access to the subscriber card is protected by the PIN code, i.e., if the PIN code is set, the cell phone will prompt the subscriber to input the PIN code to start up the cell phone.

Although information in the subscriber card can be protected by setting a PIN code, it is not widely acceptable by the subscribers. Because the subscriber has to input the PIN code each time accessing the card, i.e., each time starts up the cell phone. Therefore, the existing PIN code of the subscriber card does not work to ensure the security of the subscriber card due to most subscribers not willing to use the PIN code. Thus the PIN code becomes useless. Just as any regulation and legal clause, no matter how precise they are, they must have operability.

SUMMARY OF THE INVENTION

The present invention provides a method for ensuring the security of a subscriber card, wherein, the security of the subscriber card is guaranteed and the subscriber card is more convenient to use simultaneously, so that mobile subscriber can use the subscriber card conveniently and safely.

The present invention is implemented through the following technical scheme:

A method for ensuring the security of a subscriber card includes the following steps:

setting a security key in a subscriber card; setting a verification equipment and storing the security key in the verification equipment;

the subscriber card authenticating the verification equipment according to the security key before responding to a relevant access request; if the authentication succeeds, the relevant access will be permitted; otherwise, the relevant access will be refused.

It can be seen from the technical scheme of the present invention that, the present invention sets a security key in the subscriber card, and sets a verification equipment and stores the security key in the verification equipment; the subscriber card authenticates the verification equipment according to the security key before responding to a relevant access request; if the authentication succeeds, the relevant access will be permitted; otherwise, the relevant access will be refused. The verification equipment herein can be a mobile terminal. Therefore, after the subscriber card is configured with the security protection function, the authentication will not pass when the subscriber card is inserted into an illegal terminal, and relevant accesses to the subscriber card will be refused. So that security of the subscriber card is guaranteed. However, the authentication will pass when the subscriber card is inserted into the legal terminal, and accesses to the subscriber card can be performed directly. Therefore, the subscriber can conveniently use the subscriber card without inputting the PIN code.

It also can be seen that, in the present invention, the security of the subscriber card is guaranteed and usability of the subscriber card is improved through the authentication of the verification equipment by the subscriber card. Accordingly, the security problem of the subscriber card, which is brought by the subscriber's not willing to input the PIN code, is resolved.

DETAILED DESCRIPTION OF THE PREFERRED EMBODIMENTS

The present invention will be illustrated in detail hereinafter with reference to the accompanying drawings and specific embodiments.

The present invention sets a security key in the subscriber card, and sets a verification equipment and stores the security key in the verification equipment; the subscriber card authenticates the verification equipment according to the security key before responding to a relevant access request; if the authentication succeeds, the relevant access will be permitted; otherwise, the relevant access will be refused.

Figure 1:
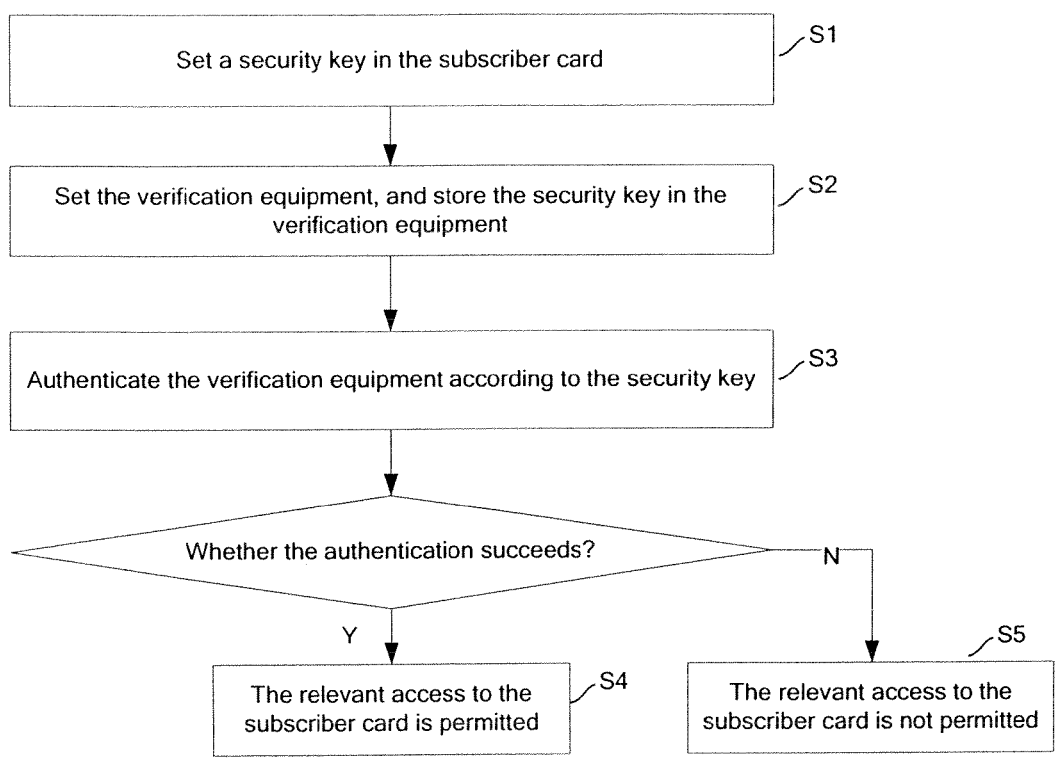
FIG. 1 is a general flowchart illustrating a procedure of ensuring the security of the subscriber card.

FIG. 1 is a general flowchart illustrating a procedure of ensuring the security of the subscriber card. As shown in FIG. 1, it includes the following steps:

Step S1: set a security key in the subscriber card.

Wherein, the subscriber card can generate the security key by performing a certain calculation, e.g. a brief calculation, according to a root key and a random number. And the random number can be generated by the mobile terminal. Certainly, the security key can also be a random number directly generated by the mobile terminal or a random value inputted by the subscriber. For instance, the terminal prompts the subscriber to input the PIN code of the subscriber card, and then sets a randomly generated security key in the subscriber card according to the PIN code of the subscriber card inputted by the subscriber.

Step S2: set a verification equipment and store the security key in the verification equipment.

The verification equipment can be the terminal itself or an electronic key or equipment at a network side, such as an HLR, an Authentication Center (AC), an EIR, etc.

If the verification equipment is the terminal itself, the terminal can directly store the security key. If the verification equipment is the electronic key, then set a wireless receiving/transmitting module in the mobile terminal and the electronic key respectively, the mobile terminal and the electronic key establish a wireless connection through the wireless receiving/transmitting modules, the mobile terminal transmits interactive information between the subscriber card and the electronic key through the established wireless connection. Thus, the mobile terminal can set the security key into the electronic key through the wireless connection. The wireless connection can be established through infrared ray or Bluetooth or other communication techniques. Certainly, it is also applicable to set a data communication line interface in the mobile terminal and the electronic key respectively, the mobile terminal and the electronic key establish a cable communication connection through the data communication line between the two interfaces, the mobile terminal transmits the interactive information between the subscriber card and the electronic key through the cable connection.

If the verification equipment is the HLR or other network equipment, the mobile terminal and the verification equipment can interact with each other by short messages or Over The Air (OTA) interfaces or service operation commands (e.g. setting call transfer commands or examining call transfer state commands). Certainly, the mobile terminal and the verification equipment can also interact by other signaling modes.

Step S3: the subscriber card authenticates the verification equipment according to the security key before responding to a relevant access request; if the authentication succeeds, execute step S4, and the relevant access will be permitted; otherwise, execute step S5, and the relevant access will be refused.

The relevant access request herein can be an access request for information stored in the subscriber card, e.g. examining a number book stored in the subscriber card, examining short messages stored in the subscriber card, etc. Or the relevant access request herein can be a request for accessing operation of the network service setting data, e.g. some subscribed service setting data provided by the operators. Or the relevant access request herein can be a request for executing corresponding brief calculations or encryption/decryption calculations, e.g., the terminal sends a random number to the subscriber card, and the subscriber card performs the brief calculation upon the random number according to the stored root key and then transmits the calculated brief value to the terminal.

There are many ways for the subscriber card to authenticate the verification equipment according to the security key, e.g., the verification equipment can directly transmits the security key stored by itself to the subscriber card, the subscriber card compares the security key from the verification equipment with that stored in the subscriber card itself, and judges whether the two security keys are the same, if they are the same, the authentication succeeds; otherwise, the authentication is failed.

Or, the subscriber card performs a corresponding calculation according to the security key to obtain a first calculated result. The verification equipment performs a corresponding calculation according to the security key to obtain a second calculated result and transmits the second calculated result to the subscriber card. And then the subscriber card compares the first calculated result with the second calculated result. If the two results are the same, the authentication succeeds; otherwise, the authentication is failed. The calculation herein can be a brief calculation, and referring to a book "Applied Cryptography" for related algorithms of the brief calculation, or referring to related security standards of mobile communications, the brief calculation is not to be illustrated herein. Certainly, the calculation can also be an encryption calculation.

Certainly, the above-mentioned judgment according to the first calculated result and the second calculated result can further include: generating an authentication number, and the above-mentioned brief calculation is performed according to both the security key and the authentication number, in other words, the subscriber card and the verification equipment respectively perform a brief calculation according to the stored security key and authentication number to obtain the first calculated result and the second calculated result. The authentication number herein can be a random number.

Generally, when the subscriber card authenticates the verification equipment the authentication number is generated and transmitted to verification equipment by the subscriber card.

The present invention will be illustrated again in detail hereinafter with reference to the accompanying drawings and specific embodiments.

Figure 2:
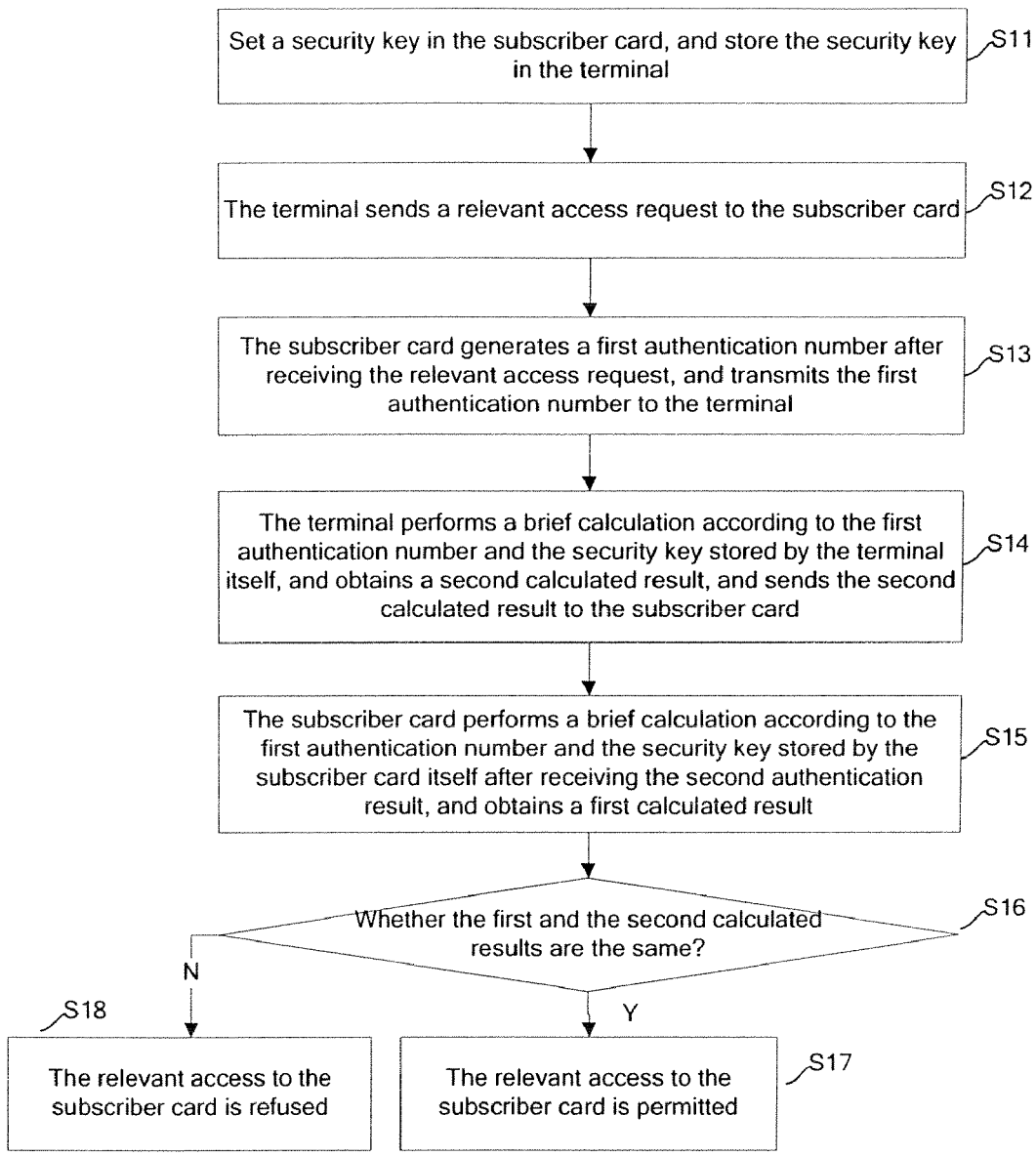
FIG. 2 is a flowchart illustrating a procedure of ensuring the security of the subscriber card according to a first embodiment of the present invention.

As shown in FIG. 2, which is a flowchart illustrating a first embodiment of the present invention, the verification equipment in this embodiment is the terminal.

Step S11: set a security key in the subscriber card and store the security key in the terminal.

Step S12: the terminal sends a relevant access request to the subscriber card.

Step S13: the subscriber card generates a first authentication number after receiving the relevant access request, and transmits the first authentication number to the terminal.

Step S14: the terminal performs a brief calculation according to the first authentication number transmitted by the subscriber card and the security key stored by itself, to obtain a second calculated result and transmits the second calculated result to the subscriber card.

Step S15: the subscriber card performs a brief calculation after receiving the second calculated result according to the first authentication number and the security key stored by the subscriber card itself, to obtain a first calculated result.

Step S16: the subscriber card judges whether the first calculated result and the second calculated result are the same, if they are the same, the terminal is allowed to access the subscriber card in step S17; otherwise, the terminal is refused to access the subscriber card in step S18.

The above-mentioned authentication number can also be generated and transmitted to the verification equipment by the verification equipment. At this time, before the subscriber card performs the brief calculation and obtains the first calculated result, the subscriber card can further judge whether the authentication number generated by the verification equipment is legal, so as to avoid attacks by illegal authentication numbers. If the authentication number generated by verification equipment is illegal, the current authentication upon the verification equipment is failed. The brief calculation is performed only when the authentication number generated by the verification equipment is legal. Certainly, the objective of the present invention can also be attained without the authentication by the subscriber card, but the security level is relatively low.

Figure 3:
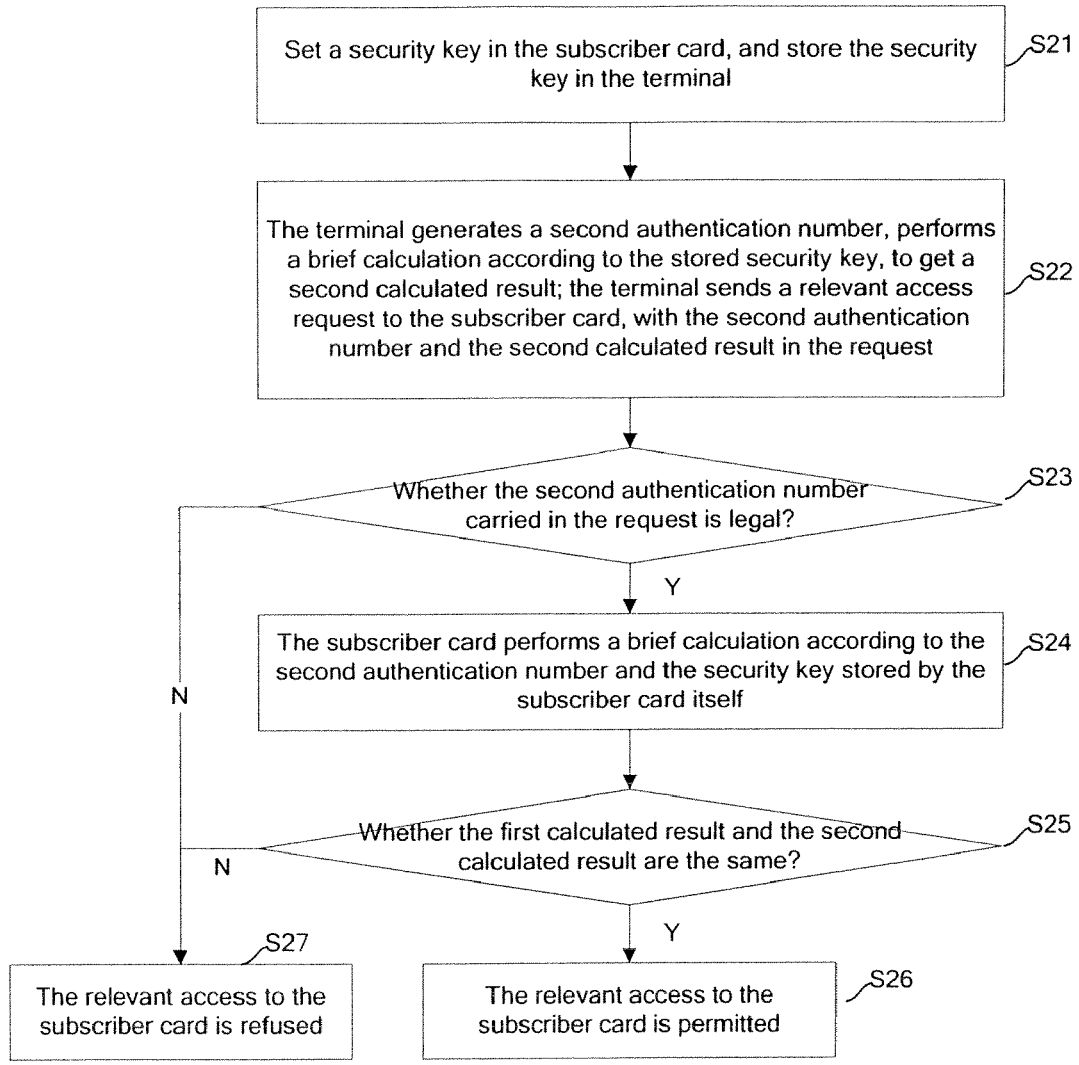
FIG. 3 is a flowchart illustrating a procedure of ensuring the security of the subscriber card according to a second embodiment of the present invention.

As shown in FIG. 3, which is a flowchart illustrating a second embodiment of the present invention, in this embodiment, the verification equipment generates an authentication number, and the subscriber card verifies the authentication number. And the verification equipment in this embodiment is the terminal.

Step S21: set a security key in the subscriber card and store the security key in the terminal.

Step S22: the terminal generates a second authentication number, and performs a brief calculation according to the second authentication number and the security key stored by the terminal itself, to obtain a second calculated result. The terminal sends a relevant access request to the subscriber card, with the generated second authentication number and the second calculated result in the relevant access request.

Step S23: the subscriber card judges whether the second authentication number carried in the information is legal after receiving the relevant access request, if it is illegal, execute step S27 and end the current procedure; otherwise, execute step S24 subsequently. The subscriber card can avoid the attacks of messages re-transmitting by judging whether the second authentication number carried in the request information is legal.

Step S24: the subscriber card performs a brief calculation according to the second authentication number and the security key stored by the subscriber card itself, to obtain a first calculated result.

Step S25: the subscriber card judges whether the first calculated result and the second calculated result are the same, if they are the same, the terminal is allowed to access the subscriber card in step S26; otherwise, the terminal is refused to access the subscriber card in step S27.

The procedure of subscriber card judging whether the second authentication number is legal in step S23 can be implemented by confirming repeatability of the authentication number, i.e., judging the repeatability of the second authentication number generated by verification equipment. Therefore, it can be effectively avoided that the attacker attacks the subscriber card by the same authentication number or a used authentication number. For instance, when it is needed to judge the repeatability of the authentication number, the subscriber card can store the second authentication number which is generated and sent to the subscriber card by the verification equipment last time the authentication succeeds. During the current authentication, the subscriber card judges whether the current authentication number generated by the verification equipment is greater or smaller than the previously stored authentication number, which is generated by the verification equipment last time the authentication succeeds. Wherein, if the authentication number is generated in an ascending order, the subscriber card judges whether the current authentication number generated by the verification equipment is greater than the previously stored authentication number; if the authentication number is generated in a descending order, the subscriber card judges whether the current authentication number generated by the verification equipment is smaller than the previously stored authentication number. Wherein, the verification equipment can be requested to generate authentication numbers in ascending or descending orders. At this time, the subscriber card can store the authentication number generated by the verification equipment when the current authentication succeeds, so that the subscriber card can judge whether the new authentication number generated by the verification equipment is legal during the next authentication.

Certainly, before the subscriber card authenticates the verification equipment, i.e. before the verification equipment sends a new second authentication number to the subscriber card, the verification equipment can authenticate the new second authentication number generated by the verification equipment itself beforehand. Specifically, when the authentication upon the verification equipment succeeds, the subscriber card stores the second authentication number corresponding to the authentication. During the next authentication, the subscriber card sends the stored second authentication number to the verification equipment, the verification equipment judges whether the new second authentication number is legal when generating the new second authentication number according to the second authentication number sent by the subscriber card, so as to guarantee that the new second authentication number can pass the authentication by the subscriber card. For instance, if the subscriber card requests the verification equipment to generate the authentication number in an ascending order, the verification equipment needs to judge whether the new second authentication number generated by the verification equipment itself is greater than the previous one, which is sent by the subscriber card and stored by the subscriber card last time when the authentication succeeds, if the new second authentication number is greater than the previous one, the current authentication will be performed using this new second authentication number, otherwise, the verification equipment re-generates a new second authentication number and judges again whether the new second authentication number generated by the verification equipment itself is greater than the previous one, which is sent by the subscriber card and stored by the subscriber card last time the authentication succeeds. And this procedure will be repeated until the verification equipment generates a second authentication number satisfying the requirement. Certainly, the incremental/decreasing authentication number sequence can also be generated by a function which can generate incremental/decreasing random numbers.

Generally, during the procedure of the verification equipment generating the new second authentication number, the subscriber card can send a stored or generated seed number to the verification equipment, and the verification equipment generates the second authentication number according to the seed number. Wherein, the seed number sent to the verification equipment by the subscriber card can come from other equipment such as the verification equipment, or be generated by the subscriber card itself, or be generated by the subscriber card according to information from other equipment.

In practical applications, the first authentication number can also be generated by the subscriber card, and the second authentication number can be generated by the verification equipment. And the brief calculation can be performed according to the first authentication number, the second authentication number and the security key altogether. At this time, the first calculated result and the second calculated result are functions of the first authentication number, the second authentication number and the security key. The corresponding implementation is shown in FIG. 4.

Figure 4:
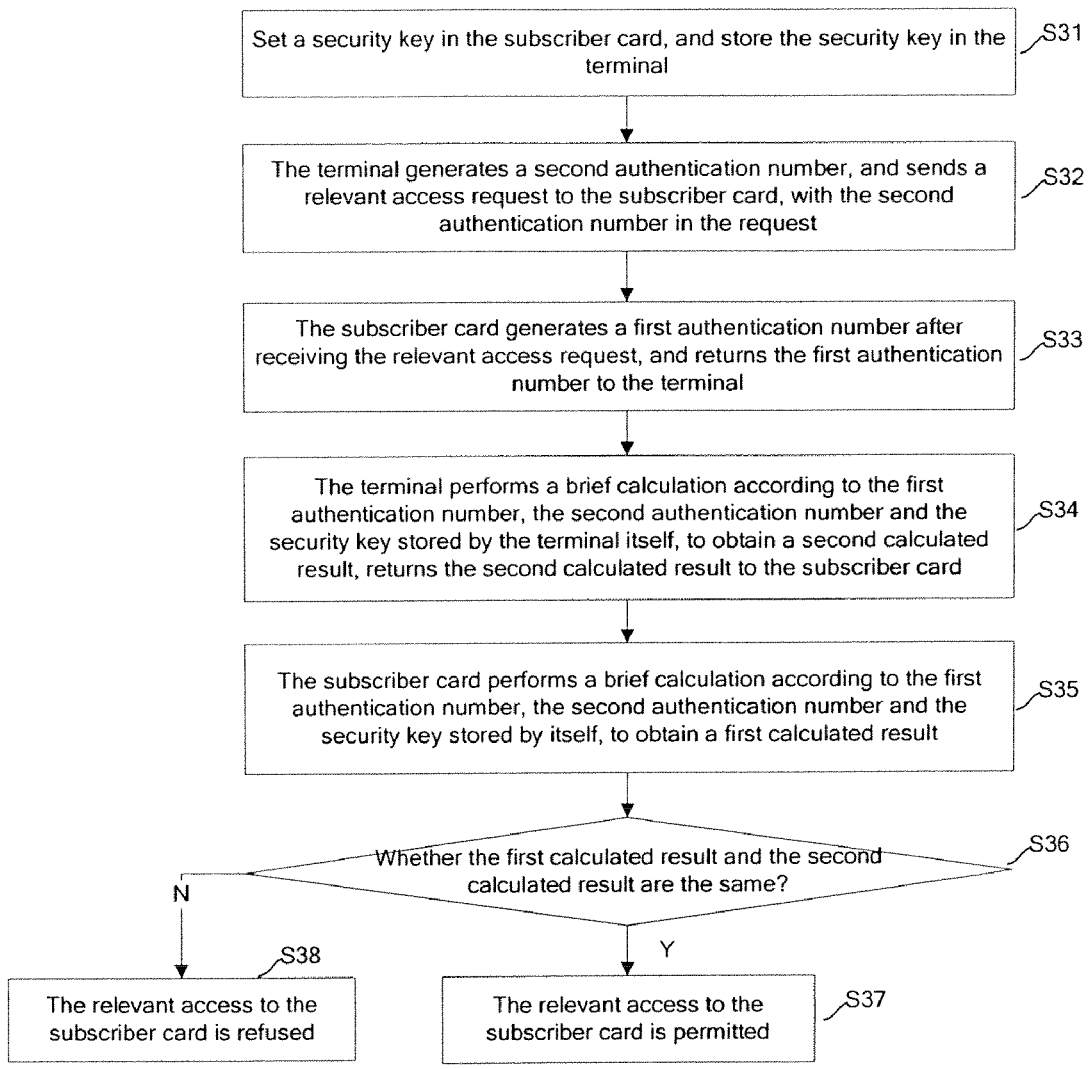
FIG. 4 is a flowchart illustrating a procedure of ensuring the security of the subscriber card according to a third embodiment of the present invention.

As shown in FIG. 4, which is a flowchart illustrating a third embodiment of the present invention, the verification equipment in this embodiment is the terminal.

Step S31: set a security key in the subscriber card and store the security key in the terminal.

Step S32: the terminal generates a second authentication number and sends a relevant access request to the subscriber card, with the generated second authentication number in the request.

Step S33: the subscriber card generates a first authentication number after receiving the relevant access request, and transmits the first authentication number to the terminal.

Step S34: the terminal performs a brief calculation according to the first authentication number which is transmitted by the subscriber card, the second authentication number generated by the terminal itself and the security key stored by the terminal itself, to obtain a second calculated result and transmits the second calculated result to the subscriber card.

Step S35: the subscriber card performs a brief calculation after receiving the second calculated result, which is transmitted by the terminal, according to the first authentication number, the second authentication number and the security key stored by the subscriber card itself, to obtain a first calculated result.

Step S36: the subscriber card judges whether the first calculated result and the second calculated result are the same, if they are the same, the terminal is allowed to access the subscriber card in step S37; otherwise, the terminal is refused to access the subscriber card in step S38.

In the above-mentioned step S34 and S35, when the subscriber card and the verification equipment perform the brief calculation using the first authentication number, the second authentication number and the security key, if any one of the first authentication number, the second authentication number and the security key of the subscriber card is different from that of verification equipment, the first calculated result and the second calculated result will be different, which will lead to the failure of the authentication upon the verification equipment performed by the subscriber card. Therefore, the subscriber card can generate a simple first authentication number, e.g. a natural number sequence, or a random incremental sequence, so that not only attacks, such as repetitive attack, can be avoided, but also the calculation complexity is not increased when the subscriber card generates the first authentication number. Afterwards, the verification equipment can generate a high-randomness authentication number, so as to avoid the attacks by taking use of the regularity of a single authentication number.

In the verification equipment, the security key of the subscriber card can be stored according to the identity information of the subscriber card. Therefore, when the subscriber card authenticates the verification equipment, the verification equipment can obtain the identity information of the subscriber card which requests for authentication, and determine the corresponding security key stored by the verification equipment itself according to the identity information of the subscriber card. And then the verification equipment performs the corresponding brief calculation according to the security key to obtain the above-mentioned second calculated result.

The identity information of the subscriber card herein can be an identity number of the subscriber card or an individual information identifier of the subscriber card generated by the subscriber. For instance, when the verification equipment is the terminal or the electronic key, the subscriber can name the subscriber card Unicom card or Mobile card. This will be very convenient for double-card cell phones, or for subscribers who use one cell phone with more than two cards.

Certainly, the terminal in the above-mentioned embodiments can also be other verification equipment.

The terminal can further judge whether the terminal itself is legal before responding to the access request of the subscriber card, if it is legal, the terminal responds to the access request of the subscriber card, otherwise, the terminal refuses the access request.

In practical applications, when the verification equipment is a terminal, the terminal security key can be stored in the terminal and relevant equipment at the network side or a terminal electronic key. The terminal can authenticate the relevant equipment at the network side or the terminal electronic key according to a terminal security key stored by the terminal itself, if the authentication succeeds, the terminal determines itself is legal; otherwise, the terminal determines itself is illegal. Wherein, the equipment at the network side can be the HLR, the AC or the EIR.

Figure 5:
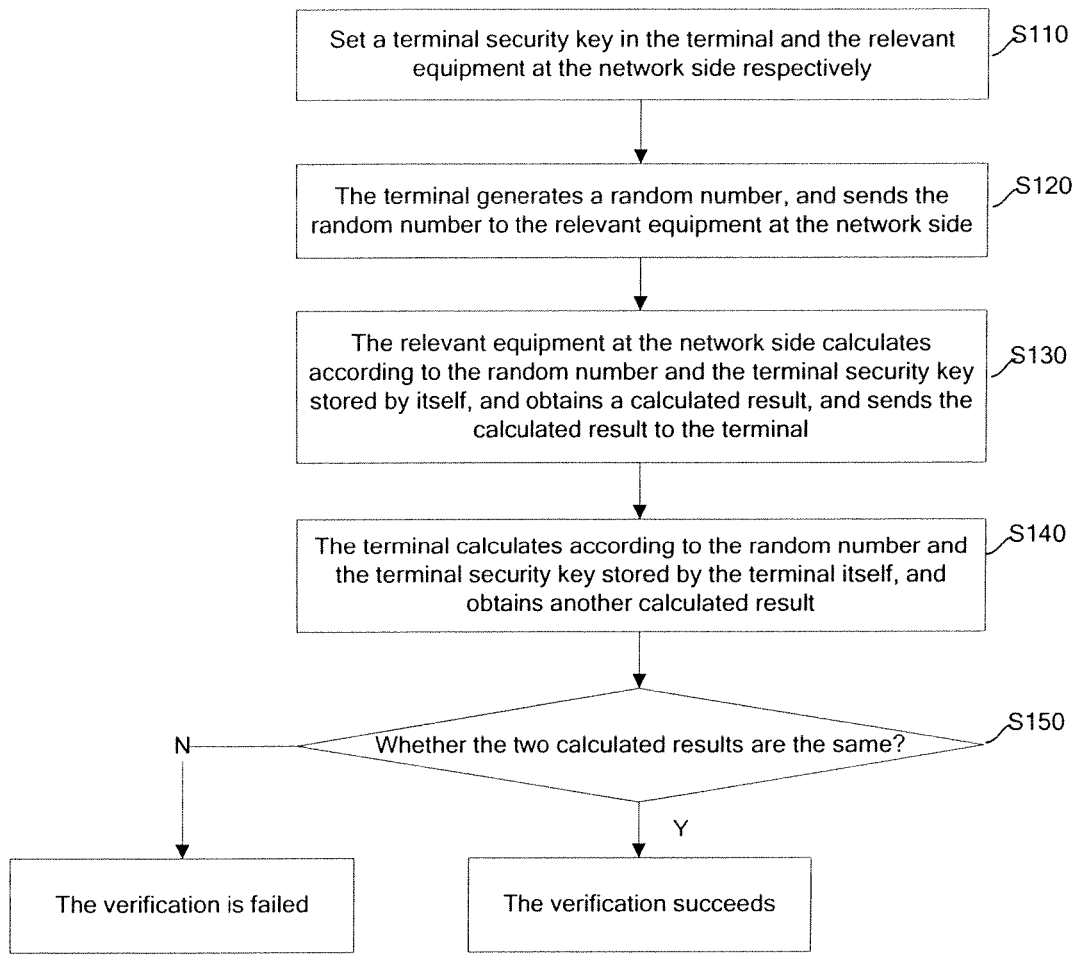
FIG. 5 is a flowchart illustrating the procedure of the terminal authenticating itself according to an embodiment of the present invention.

As shown in FIG. 5, it is a flowchart illustrating the procedure of the terminal authenticating the verification equipment according to an embodiment of the present invention. The embodiment includes the following steps:

Step S110: store a terminal security key in the terminal and the relevant equipment at the network side.

Step S120: the terminal generates a random number and then sends the random number to the relevant equipment at the network side.

Step S130: the relevant equipment at the network side obtains a calculated result according to the random number and the terminal security key stored by itself and then transmits the calculated result to the terminal.

Step S140: the terminal performs a corresponding calculation according to the random number and the terminal security key stored by the terminal itself, and obtains another calculated result.

Step S150: the terminal compares whether the calculated result calculated by the terminal itself is the same as that from the relevant equipment at the network side, if they are the same, the authentication succeeds; otherwise, the authentication is failed.

In the above-mentioned step S110, the relevant equipment at the network side can be replaced by a terminal electronic key, i.e., the terminal security key can be stored in the terminal electronic key, in subsequent steps, the relevant equipment at the network side in step S120, S130 and S150 is replaced by the terminal electronic key accordingly.

The subscriber card can be a Subscriber Identity Module (SIM) card in a Global System of Mobile (GSM) network, or an UMTS Subscriber Identity Module (USIM) card in a Code Division Multiple Access (CDMA) network. Certainly, the subscriber card can also be other subscriber identity modules, or modules with similar functions.

The terminal in the present invention can be a mobile terminal, such as a cell phone, or a PDA or other portable equipment, etc.

It should be understood that, the above illustrated embodiments are just the preferred embodiments of the present invention, and are not used for confining the protection scope of the present invention. It will be understood by those skilled in the art that, any modification, equivalent substitute and improvement within the spirit of the present invention are in the protection scope of the present invention.

What is claimed is:

1. A method for ensuring security of a subscriber card, comprising:
    setting a security key in the subscriber card; setting a verification equipment and storing the security key in the verification equipment;
    before responding to a relevant access request for accessing relevant information stored in the subscriber card, the subscriber card and the verification equipment calculated respectively according to the security key to obtain a first calculated result and a second calculated result; the subscriber card judging whether the first calculated result and the second calculated result are the same; if the first calculated result and the second calculated result are the same, the subscriber card determining that an authentication of the verification equipment succeeds, and the relevant access will be permitted by the subscriber card; otherwise, the subscriber card determining that the authentication of the verification equipment fails and the relevant access will be refused by the subscriber card.

2. The method according to claim 1, further comprising:
generating an authentication number; the subscriber card and the verification equipment calculating respectively according to the security key and the authentication number to obtain the first calculated result and the second calculated result.

3. The method according to claim 2, wherein, the authentication number is a first authentication number that is generated by the subscriber card and sent to the verification equipment, or the authentication number is a second authentication generated by verification equipment and sent to the subscriber card.

4. The method according to claim 1, further comprising:
before the subscriber card and the verification equipment calculating respectively according to the security key to obtain a first calculated result and a second calculated result, the subscriber card generating a first authentication number and sending the first authentication number to the verification equipment, the verification equipment generating a second authentication number and sending the second authentication number to the subscriber card;
the subscriber card and the verification equipment calculating respectively according to the security key, the first authentication number and the second authentication number to obtain the first calculated result and the second calculated result.

5. The method according to claim 2, wherein, the authentication number is a random number.

6. The method according to claim 3, wherein, the authentication number is a random number.

7. The method according to claim 4, wherein, the authentication number is a random number.

8. The method according to claim 3, further comprising:
before the subscriber card and the verification equipment calculating respectively according to the security key to obtain the first calculated result and the second calculated result, the subscriber card judging whether the second authentication number is legal, if it is legal, executing the subscriber card and the verification equipment calculating respectively according to the security key to obtain the first calculated result and the second calculated result and subsequent processes thereof; otherwise, the authentication is failed.

9. The method according to claim 8, wherein the subscriber card judging whether the second authentication number is legal comprises:
judging whether the second authentication number is greater than a previous one obtained when a previous authentication succeeds; if the current second authentication number is greater than the previous one, the current second authentication number is legal; otherwise, the current second authentication number is illegal.

10. The method according to claim 8, further comprising:
the subscriber card storing the second authentication number received from the verification equipment after the authentication of the verification equipment succeeds;
the subscriber card judging whether the second authentication number is legal comprises judging whether the current received second authentication number is greater than the stored second authentication number obtained when the previous authentication succeeds; if the current second authentication number is greater than the previous one, the current second authentication number is legal; otherwise, the current second authentication number is illegal.

11. The method according to claim 3, further comprising:
when the authentication number is a second authentication generated by verification equipment and sent to the subscriber card, the subscriber card sending a seed number stored or generated by the subscriber card to the verification equipment, the verification equipment generating the second authentication number according to the seed number, and then sending the second authentication number to the subscriber card.

12. The method according to claim 1, wherein, the verification equipment is a terminal;
before the terminal calculates to obtain the second calculated result, the method further comprises: the terminal judging whether the terminal is legal, if the terminal is legal, the terminal responding to the access request, otherwise, the terminal refusing the access request.

13. The method according to claim 12, further comprising: storing a terminal security key in both the terminal and a relevant equipment at a network side or in both the terminal and a terminal electronic key, the procedure of judging whether the terminal itself is legal comprises:
the terminal authenticating the relevant equipment at the network side or the terminal electronic key according to the terminal security key, if the authentication succeeds, the terminal determining itself is legal; otherwise, the terminal determining itself is illegal.

14. The method according to claim 13, wherein, the procedure of the terminal authenticating the relevant equipment at the network side or the terminal electronic key according to the terminal security key comprises:
the terminal generating a random number and sending the random number to the relevant equipment at the network side or the terminal electronic key;
the relevant equipment at the network side or the terminal electronic key calculating according to the random number and the terminal security key stored by itself, and obtaining a calculated result, and then transmitting the calculated result to the terminal;
the terminal calculating according to the random number and the terminal security key stored by the terminal to obtain another calculated result, comparing the obtained calculated result with the calculated result from the relevant equipment at the network side or the terminal electronic key and judging whether the two results are the same, if they are the same, the authentication succeeds; otherwise, the authentication is failed.

15. The method according to claim 1, further comprising:
the verification equipment storing the security key of the subscriber card according to identity information of the subscriber card;
the verification equipment obtaining the identity information of the subscriber card which requests for authentication before the subscriber card and the verification equipment calculating respectively according to the security key to obtain the first calculated result and the second calculated result, and determining the security key, which is stored by itself and used for the current calculation, according to the identity information of the subscriber card.

16. The method according to claim 15, wherein, the identity information of the subscriber card is an identity number of the subscriber card or an individual information identifier for the subscriber card generated by the subscriber.

17. The method according to claim 1, wherein, the relevant access request can be any one of: an access request for information stored in the subscriber card, a request for operating and accessing network service setting data in the subscriber card, and a request for executing corresponding brief calculations or encryption/decryption calculations.

* * * * *